United States Patent [19]
Jankovic

[11] Patent Number: 5,601,269
[45] Date of Patent: Feb. 11, 1997

[54] DUAL-CUP RACK AND PINION CUPHOLDER

[75] Inventor: Tomislav Jankovic, Etobicoke, Canada

[73] Assignee: Larizza Industries, Inc., Troy, Mich.

[21] Appl. No.: 484,989

[22] Filed: Jun. 7, 1995

[51] Int. Cl.⁶ .................................................. F16M 13/00
[52] U.S. Cl. ...................... 248/311.2; 248/550; 224/281; 297/188.17
[58] Field of Search ................................ 248/311.2, 550, 248/286.1, 298.1; 297/188.17; 224/42, 281

[56] References Cited

U.S. PATENT DOCUMENTS

| | | |
|---|---|---|
| 4,852,932 | 8/1989 | Komeya et al. . |
| 4,981,277 | 1/1991 | Elwell ................................. 248/311.2 |
| 5,018,633 | 5/1991 | Toth et al. . |
| 5,060,899 | 10/1991 | Lorence et al. . |
| 5,171,061 | 12/1992 | Marcusen ........................ 248/311.2 X |
| 5,195,711 | 3/1993 | Miller et al. ......................... 248/311.2 |
| 5,375,805 | 12/1994 | Sudak et al. . |
| 5,487,519 | 1/1996 | Grabowski ........................... 248/311.2 |
| 5,489,054 | 2/1996 | Schiff .............................. 248/311.2 X |

Primary Examiner—Lanna Mai
Attorney, Agent, or Firm—Bliss McGlynn, P.C.

[57] ABSTRACT

A container holder apparatus (10) includes a pair of collapsible and retractable holders (28, 30). The holders (28, 30) may collapse into one another so that a first holder (28) vertically rotates toward the cupholder (30) and there into so that the first holder (28) fits within the second holder (30) with their bases (31, 33) vertically positioned and parallel with one another, and sides (32, 34) overlapping. In this collapsed position, the holders (28, 30) can move into a cavity (14) of the apparatus (10). The collapsing of the holders (28, 30) and retracting thereof may be motor driven (56, 70).

10 Claims, 3 Drawing Sheets

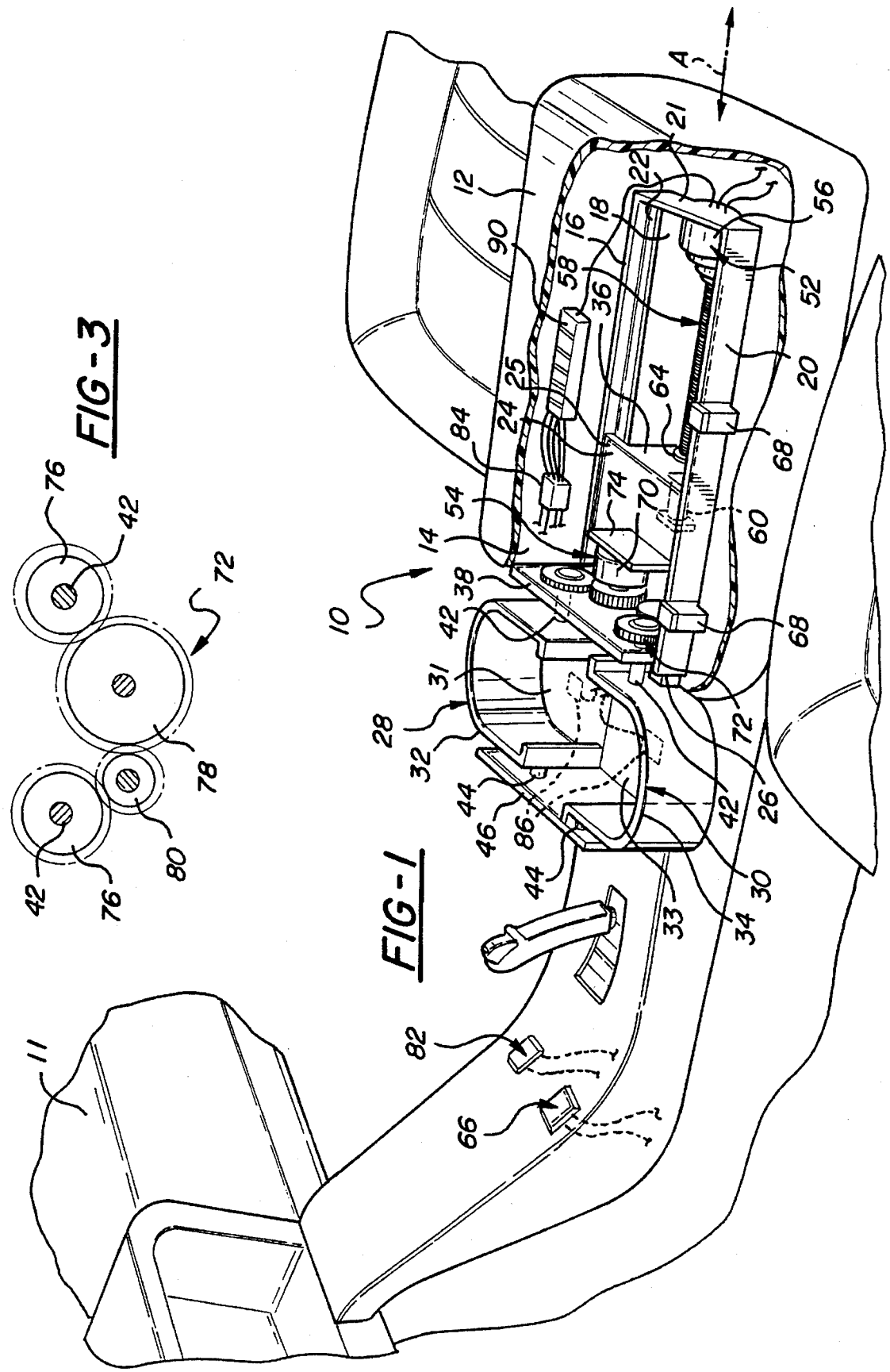

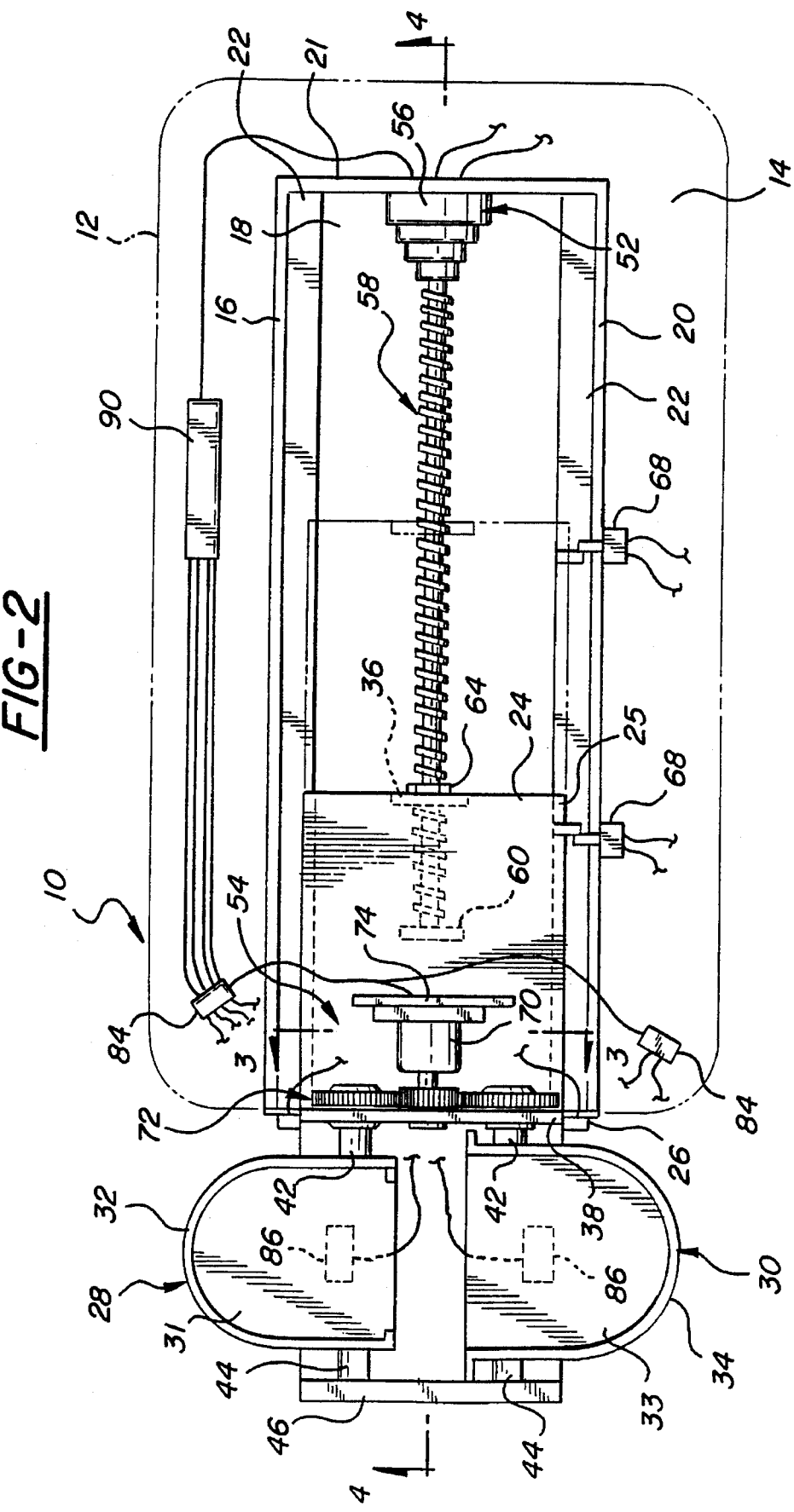

5,601,269

DUAL-CUP RACK AND PINION CUPHOLDER

TECHNICAL FIELD

This subject invention relates to beverage container holders for use in motor vehicles, and particularly toward powered cupholders which are moveable to compact stowed position.

BACKGROUND OF THE INVENTION

Beverage cupholder assemblies are common in many vehicles. Many differing types of such beverage cupholders can be mounted in various locations of the vehicle. Such cupholders are typically moveable between a stowed or concealed position within a housing and an extended or use position extending from the housing to receive and support beverage containers.

The manner in which cupholders are stored and moveable are extensive. Representative of such is U.S. Pat. No. 4,907,775 issued Mar. 13, 1990 in the name of Lorence et al. The patent discloses a container holder which includes a frame slidable within a housing and moveable between a vertical storage position and a horizontal operational position. The frame is retained within the housing in a vertical position and as the frame moves to its operational position, it is guided through a slot and pivots to the horizontal operational position. The pair of cupholders are positioned longitudinally next to one another, and move in the same direction.

Another cupholder design is disclosed in U.S. Pat. No. 5,018,633 issued May 28, 1991 in the name of Toth et al, which discloses container holders stored in a vertical facing position. As the container holders are pulled outwardly from their stored position, they are guided to a horizontal use position through guide pins and transverse guide slots in the housing.

The aforementioned cupholder assemblies require manual movement to move the cupholders to the use position. U.S. Pat. No. 4,852,932 issued Aug. 1, 1989 in the name of Komeya et al, and U.S. Pat. No. 5,375,805 issued Dec. 27, 1994 in the name of Sudak et al having common assignee herewith, disclose cupholder assemblies which use a motor to move the cupholders between the stored and used positions. U.S. Pat. No. 5,375,805 further discloses electronic sensors that detect the presence of container in the fixed cupholder member and prevents movement of the tray via the motor driven actuator when a cup is detected.

The prior art patents do not disclose a motor driven cupholder assembly moveable into and out of a recess of a housing which includes collapsible cupholders which can only pass through the recess when in the collapsed position, nor a sensor for preventing movement of the tray assembly if the cupholders members are not in the collapsed position.

SUMMARY OF THE INVENTION AND ADVANTAGES

The invention includes a stowable container holder apparatus for a vehicle. The container holder assembly comprises a housing having a recess for mounting in the vehicle, and a tray supported by and moveable with respect to the housing between a retracted stowed position in the recess and an extended position extending from the recess. The tray includes at least two holders rotatable between a collapsed position with the holder rotated a vertical position to pass into the recess and a use position to rotate from the vertical position outwardly to a horizontal position with the holders transverse to the recess preventing passage into the recess.

The container holder assembly further comprises a sensor for preventing movement of the tray to the retracted stowed position when each of the container holders are rotated to the use position.

Advantages of the subject invention include the decreased width of the container holder assembly housing made possible by providing collapsible cupholders along with structural rigidity of the holders when in the use position. Furthermore, advantages result from the provision of sensors for detecting the presence of a cup in one of the holder members and for determining the position of the holder members to control operation of the motor driven actuators based upon the sensor readings.

FIGURES IN THE DRAWINGS

Other advantages of the present invention will readily appreciated as the same becomes better understood by reference to the following detailed description when considered in connection with the accompanying drawings:

FIG. 1 is a partially cutaway perspective view of the subject invention;

FIG. 2 is a partially cutaway top view of the subject invention;

FIG. 3 is a schematic view of the gears used to actuate the holders of the subject invention.

DETAILED DESCRIPTION OF THE PREFERRED EMBODIMENT

Figure 4:
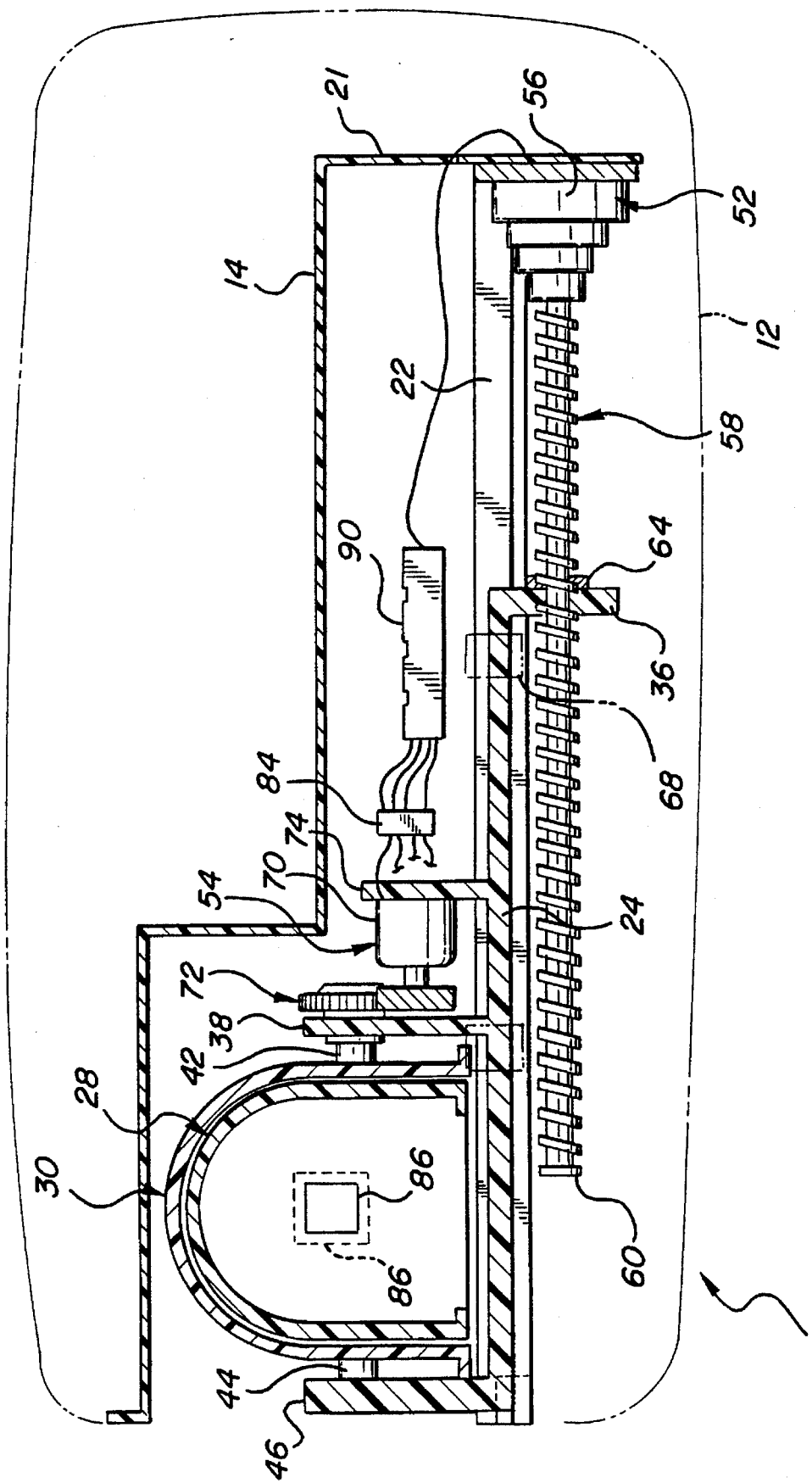
FIG. 4 is a cross-sectional side view taken along lines 4—4 of FIG. 2 showing the holders in the collapsed position and the tray in the stowed position.

A stowable container holder apparatus 10 for use in a vehicle 11 is generally illustrated in the Figures. The apparatus 10 includes a housing 12 for mounting in the vehicle 11. The housing 12 is mounted in a support structure of the vehicle 11, such as an armrest or console as illustrated in FIG. 1. However, it is to be appreciated that the assembly 10 may be located elsewhere in the vehicle 11.

The housing 12 comprises a generally elongated rectangular shaped cavity 14 therein. The cavity 14 includes a carrier 16 therein and affixed thereto comprising a rectangular base 18 having two longitudinal opposing upstanding walls 20 and a rear wall 21 fixed securely thereto. The two opposing side walls 20 include a longitudinal track 22, as subsequently discussed, for guiding movement of a tray 24. It will be appreciated that the carrier 16 may take the form of a variety of configuration. The housing 12 includes an open end 26 for providing access to the cavity 14, which is also aligned with the open side of the carrier 16. The carrier 16 and the housing 12 may be the same element, or may be separate members as desired for securing to the vehicle.

The carrier 16 is horizontally and fixedly mounted in the vehicle 11. The tray 24 moves with respect to the carrier 16 into and out of the open end 26 of the housing 12. The tray 24 generally comprises a flat rectangular member having longitudinal side edges 25 engaged within the track 22. The tray 24 is operatively connected to and supports a pair of holders 28, 30, as subsequently discussed. The tray 24 is moveable with respect to the housing 12 between a retracted stowed position as illustrated in FIG. 4 and an extended, use position as illustrated in FIGS. 1 and 2. In the stowed position, the tray 24 substantially overlies the carrier 16 within the cavity 14 of the housing 12. The cupholders 28, 30 are not capable of being used in the stowed position. In the extended use position, a portion of the tray 24 extends outwardly the carrier 16 and cavity 14 through the open end 26, and is exposed and capable of being used.

The tray 24 moves linearly in the direction of the longitudinal axis A of the carrier 16 and housing 12. It will be appreciated that the movement of the tray 24 between the extended and use positions may take place in any other manner.

The holders 28, 30 are rotatable between a collapsed position with the holders 28, 30 rotating vertically toward one another to a vertical position to allow passage into the open end 26, and a use position to rotate away from one another to a horizontal position transverse to the open end 26 and thereby preventing passage into the open end 26. The holders 28, 30 each comprise a base 31, 33 and support walls 32, 34, respectively, extending perpendicular from the base 31, 33. In the use position, support walls 32, 34 extend vertically upwardly with the base 31, 33 horizontal thereto. In the preferred embodiment, the support walls 32, 34 comprise a generally semi-circular shape having straight parallel flanges or sides extending therefrom providing an open end, to support the sides of a container. A first of the holders 28 is configured slightly smaller in dimension than the second of the holders 30 so that the support walls 32, 34 may overlap and fold into one another in the collapsed position. The first holder 28 has the semi-circular shape of a radius less than the radius of the second holder 30. The support walls 32, 34 rotate in a vertically upward direction about their open end so that the support wall 32 of the first holder 28 rotates into the support wall 34 of the second holder 30 and aligned therewith. In this position, the bases 31, 33 are vertical and parallel with one another. The support walls 32, 34 overlap one another. The holders 28, 30 may support various types of beverage containers, i.e., cups, bottles, glasses, etc.

In the use position, the support walls 32, 34 extend outwardly from the housing 12 transverse to the axis A and extend a combined width greater than the width of the open end 26. Therefore, the holders 28, 30 when horizontally positioned cannot be pushed into the housing 12. However, in the collapsed position with the support walls 32, 34 overlapping one another and holders 28, 30 vertically positioned, the holders 28, 30 may be guided into the open end 26 of the housing 12. The tray 24 is of a width equivalent to the open end 26, therefore, the holders 28, 30 extend outwardly from the sides 25 of the tray 24.

The specific implementation of the apparatus 10 may be as illustrated herein, however, it is to be understood that the teachings of the general concept may be implemented by other types of controls.

The tray 24 include a driven flange 36 extending downwardly therefrom at a rear end of the tray 24. The tray 24 includes a cupholder support plate 38 extending upwardly from the tray 24 in a direction opposite the driven flange 36. The holder support plate 38 is generally fixedly connected perpendicular to the tray 24. The holder support plate 38 includes apertures 40 therethrough for receiving rotatable pins 42 therethrough for connection to the support walls 32, 34. On opposite sides of the support walls 32, 34 from the pins 42 are a second set of pins 44 rotatably connected between the support walls 32, 34 and a front cover plate 46. The front cover plate 46 is connected to the front end of the tray 24 and extends upwardly and perpendicular thereto to further aid support of the holders 28, 30. Therefore, it can be seen that the holders 28, 30 can pivot about the pins 42, 44 vertically upwardly (FIG. 4) and horizontally outwardly (FIG. 1). Furthermore, the front cover plate 46 is of complementary size to the open end 26 of the housing 12 so that when the apparatus 10 is in the retracted stowed position, the front cover plate 46 closes the housing 12 and cavity 14.

The apparatus 10 include control means for controlling movement of the holders 28, 30 between the retracted stowed position and extended position, and also between the collapsed (vertical) position and use (horizontal) position. In the preferred embodiment, the control means includes extension control means 52 for controlling movement of the tray 24 between the retracted stowed position and the extended position, and collapse control means 54 for controlling movement of the cupholders 28, 30 between the collapsed position and the use position.

The extension control means 52 allows for automatic control of the tray 24 between the retracted stowed position and extended position. The extension control means 52 comprises a motor 56 for receiving electrical energy and connected to drive means 58 for transmitting the rotational motion of the motor 56 to extend the tray 24 into and out of the housing 12. The motor 56 may comprise any type of bi-directional DC motor. The drive means 58 generally comprises a helical threaded shaft. The shaft 58 extends along the longitudinal axis A of the cavity 14 of the housing 12 below the tray 24. The driven flange 36 of the tray 24 is operatively connected to the shaft 58 so that rotation of the shaft 58 moves the tray 24 in a linear direction, depending on the direction of rotation. The motor 56 and drive shaft 58 may be as specifically disclosed in U.S. Pat. No. 5,375,805, incorporated by reference herein.

The threaded shaft 58 is rotatably secured to the housing 12. More specifically, the threaded shaft 58 is rotatably secured between the motor 56 and a bearing housing 60 that is secured to the housing 12 near the front of the cavity 14.

The driven flange 36 includes receptacle means comprising a receptacle opening 62 in the driven flange 36 for receiving the helically threaded shaft 58 and a nut 64 fixedly secured to the driven shaft 36 to normally engage the helical threads of the shaft 58. The nut 64 does not rotate relative to the tray 24. The tray 24, driven flange 36 and the nut 64 move along the helical threads of the shaft 58 as same rotates driven by the motor 56.

Referring to FIG. 1, the extension control means 52 further includes a first selection switch 66. The first selection switch 66 is remote from the motor 56 and selectively supplies energy to the motor 56 to control movement of the tray 24 between the stowed and extended positions. More specifically, the first selection switch 66 comprises a momentary switch for selectively providing energy to the motor 56. The switch 66 may include a toggle switch or a three positions switch to that of off-neutral, extend and retract. Such switches 66 are commonly known in the art. When the switch 66 is moved to the extend position, the motor 56 receives energy of a first polarity to rotate the shaft 58 in a first direction to extend the tray 24 from the housing 12. When the retract position of the switch 66 is selected, the motor 56 is driven in the reverse polarity to drive the shaft 58 in a second direction opposite the first direction to retract the tray 24 into the housing 12. Various types of switches 66 may be utilized, such as a toggle switch or any other type of switch.

Furthermore, the apparatus 10 includes a plurality of limit switches 68 that deenergize the motor 56 when the tray 24 has reached either the fully stowed position or the fully extended position. More specifically, the pair of limit switches 68 are placed on the housing 12 or carrier 16 and may be activated by the tray 24 in either the fully extended position or fully retracted stowed position. Such switches 68 may be commonly available electronic switches, such as limit or contact switches.

The holders 28, 30 may be manually manipulated between the collapsed position and use position. The cupholders 28, 30 may be spring biased into the use position such that upon extension of the tray 24 to the extended position, the holders 28, 30 automatically extend to the use position. This would require the user to pull the cupholders 28, 30 together in the collapsed position prior to actuating the selection switch 66 to retract the tray 24.

In the preferred embodiment, the collapsed control means 54 automatically controls the holders 28, 30 between the collapse and use positions. More specifically, the collapse control means 54 includes a second motor 70 and second drive means 72. The second motor 70 receives energy and converts it to mechanical rotational motion as with the first motor 56. The second drive means 72 is operatively connected to the second motor 70 and transmits motion to the holders 28, 30. In the preferred embodiment, the second motor 70 also comprises a bi-directional DC motor. The motor 70 is secured to the tray 24, and preferably to an upright motor support 74 extending upwardly from the tray 24 and parallel with the cupholder support plate 38. The second actuator means 72 comprises gearing to control rotation of the holders 28, 30 in response to rotation by the second motor 70. The gearing is supported on the cupholder support plate 38 and is driven by the motor 70. The motor 70 and gearing are positioned between the motor support plate 74 and holder support plate 38.

The gearing is specifically illustrated in FIG. 3, and includes pair of drive gears 76 have their shaft connected to the pins 42 extending through the support plate 38, as previously discussed. A primary gear 78 is connected to the motor 70 and transmits rotation through a reversing gear 80 and drive gear 76 to the second holder 30 and directly to the drive gear 76 to the first holder 28. It is to be appreciated that other types of gearing or drive members may be used to accomplish the intended rotation.

The collapse control means 54 further includes a second selection switch indicated at 82. The second selection switch 82 is remote from the second motor 70 and selectively supplies energy and directional control thereto. As with the first switch 66, selection may be made between a neutral position, collapsed position and use position as with the first switch 66, and operates similar therewith to control direction.

The apparatus 10 further includes holder sensor means 84 for sensing whether holders 28, 30 are in the use or collapsed position. When the holders 28, 30 are in the use position, the sensor 84 prevents energy from being supplied to the first motor 56 to prevent movement of the tray 24 into the retracted stowed position. More specifically, the sensor 84 comprises a photo-optical sensor for transmitting light rays to detect the holders 28, 30 when in the use position. It is to be appreciated that other types of sensors may be utilized, such as contact switches, etc. If the holders 28, 30 are detected by the sensor 84 as in the use position, the sensor 84 produces a signal to prevent energization of the first motor 56 to prevent the apparatus 10 from attempting to move the tray 24 inwardly while the holders 28, 30 are horizontal and unable to be received in the open end 26. The sensor may include two photo optical sensors, one for each cupholder 28, 30.

The apparatus 10 also includes container detector sensors 86, similar in type as those disclosed in the referenced patent U.S. Pat. No. 3,375,805. Such sensors 86 can also disable both of the motors 56, 70 upon detection of a container therein. When a container is detected in the holders 28, 30, the sensors 86 prevents energy from being supplied to the first and second motors 56, 70 to prevent movement of the apparatus 10 by transmitting a disable signal. The sensors 86 may comprise a photo-optical device for transmitting light rays to detect presence of a container resting on the flat base 31, 33 of the holders 28, 30. Any number of sensors may be utilized, i.e. one or two.

A connector 90 may electrically connect the sensors 84, 86, limit switches 68 and motors 56, 70 to one another. The connector 90 also may supply power to the respective motor 56, 70 to the vehicle power, as commonly known. The container sensors 86 will disable both motors 56, 70 when activated by a container, and the holder sensor 84 will disable only the first motor 56 when activated. Power is also controlled by the selection switches 66, 82.

In operation, the apparatus 10 is initially in its retracted stowed position. Initially, the tray 24 is retracted or stowed within the open end 26 and cavity 14 of the housing 12. With the tray 24 in this position, the holders 28, 30 are in the collapsed position shown in FIG. 4. The first selection switch 66 is moved from the neutral position to the extend position and is released. The motor 56 is energized and causes the tray 24 to move from the stowed position to the extended position until the outer limit switch 68 is activated to deenergize the motor 56. After the tray 24 is in the use position, a user activates the second selection switch 82 to energize the second motor 70 to cause the holders 28, 30 to move from the collapsed position to the use position. It is to be appreciated that such control circuitry may be designed so that the holders 28, 30 automatically move from the collapsed position to the use position, or vice versa, upon one touch control of the first switch.

If the user attempts to return the tray 24 to the stowed position by activating only the first selection switch 66 while the holders 28, 30 are in the use position, the holder sensor 84 will preclude energization of the motor 56. The container sensors 86 prevent energization of both motors 56, 70 if a container is detected within the holders 28, 30. In the use position, the cupholders 28, 30 can receive and support containers on the base 31, 33 thereof.

To return the tray 24 to the stowed position after all containers have been removed from the holders 28, 30, the second selection switch 82 may be actuated. After the holders 28, 30 are collapsed, the first selection switch 66 may be actuated to retracted the tray 24 into the cavity 14 of the housing 12.

The invention has been described in an illustrative manner, and is to be understood that the terminology which has been used is intended to be in the nature of words of description rather than of limitation. Many modifications and variations of the subject invention are possible in light of the above teachings. It is therefore to be understood that within the scope of the appended claims, the invention may be practiced otherwise than as specifically described.

What is claimed is:

1. A stowable container holder apparatus for a vehicle comprising:

a housing having a recess;

a tray slidably supported in said housing and moveable with respect to said housing between a retracted stowed position in said recess and an extended position extending from said recess;

at least two holders rotatably supported on said tray for pivoting between a collapsed position with said holders rotated to a vertical position to pass into said recess, and a use position to rotate from said vertical position outwardly to a horizontal position with said holders transverse to said recess preventing passage into said recess; and said holders including a base and support walls connected upwardly therefrom for supporting a container; a first of said holders including said support walls separated by a first predetermined distance and the second of said holder including said support walls separated by a second predetermined distance greater than said first predetermined distance so that said support walls of said first holder may be pivoted from said horizontal position into said support walls of said second holder in said vertical position with said support wall overlapping and said bases substantially vertical in said collapsed position, and rotating outwardly therefrom with said bases substantially horizontal and said support walls vertically extending in said use position.

2. An apparatus as set forth in claim 1 further including holder sensor means for sensing said holders positioned in said use position for preventing movement of said tray to said retracted stowed position when said holders are in said horizontal position.

3. An apparatus as set forth in claim 2 further including an electro-mechanical drive for automatically moving said tray between said retracted stowed position and said extended use position, and including a selection switch for actuation to designate one of said retracted stowed position and said extended position.

4. An apparatus as set forth in claim 3 wherein said electronic drive means include a motor which is operatively connected to said holder sensor means for being disabled when said holder sensor means detects said holders in said use position.

5. An apparatus as set forth in claim 4 further including holder control means for electronically and automatically controlling said holders between said collapsed position and said use position, and further including a selection switch for actuation by user for selection to one of said extended position and collapsed position.

6. An apparatus as set forth in claim 1 wherein said support walls of each of said holder include parallel walls with pins extending outwardly therefrom, said tray including support walls extending therefrom with said holders positioned therebetween for receiving said pins to allow pivotal and rotational movement of said holders between said support walls.

7. A stowable container holder apparatus for a vehicle comprising:

a housing having a recess;

a tray slidably supported in said housing and moveable with respect to said housing between a retracted stowed position in said recess and an extended position extending from said recess;

at least two container holders rotatably supported by said tray for pivoting between collapsed position for insertion into said recess and a use position extending outwardly of said recess preventing insertion into said recess;

extension control means operatively connected to said container holders and said tray for automatically moving said tray between said retracted stowed position and said extended position; and said extension control means including a holder sensor means for sensing a position of said container holders as in said collapsed position and said use position for preventing movement of said tray into said retracted stowed position from said extended position when said container holders are in said use position independent of the presence of a container in said container holders.

8. An apparatus as set forth in claim 7 further including holder control means for electronically and automatically controlling said holders between said collapsed position and said use position, and further including a selection switch for actuation by user for selection to one of said extended position and said collapsed position.

9. An apparatus as set forth in claim 7 wherein said two container holders pivot between said collapsed position with said holders rotated to a vertical position to pass into said recess, and the use position to rotate from said vertical position outwardly to a horizontal position with said container holders transverse to said recess preventing passage into said recess, said container holders including a base and support walls connected upwardly therefrom for supporting a container, and a first of said container holders including said support walls separated by a first predetermined distance and the second of said container holders including said support walls separated by a second predetermined distance greater than said first predetermined distance so that said support walls of said first holder may be pivoted from said horizontal position into said support walls of said second holder in said vertical position with said support wall overlapping and said bases substantially vertical in said collapsed position, and rotating outwardly therefrom with said bases horizontal and said support walls vertically extending in said use position.

10. A stowable container holder apparatus for a vehicle comprising:

a housing having a recess;

a tray slidably supported in said housing and moveable with respect to said housing between a retracted stowed position in said recess and an extended position extending from said recess;

at least two holders rotatably supported on said tray for pivoting between a collapsed position with said holders rotated to a vertical position to pass into said recess, and a use position to rotate from said vertical position outwardly to a horizontal position with said holders transverse to said recess preventing passage into said recess;

holder control means for electronically and automatically controlling said holders between said collapsed position and said use position, and further including a selection switch for actuation by user for selection to one of said extended position and collapsed position.

* * * * *